June 24, 1930.  A. F. PIEPER  1,767,612
COUPLING FOR CONDUCTORS
Filed April 28, 1926
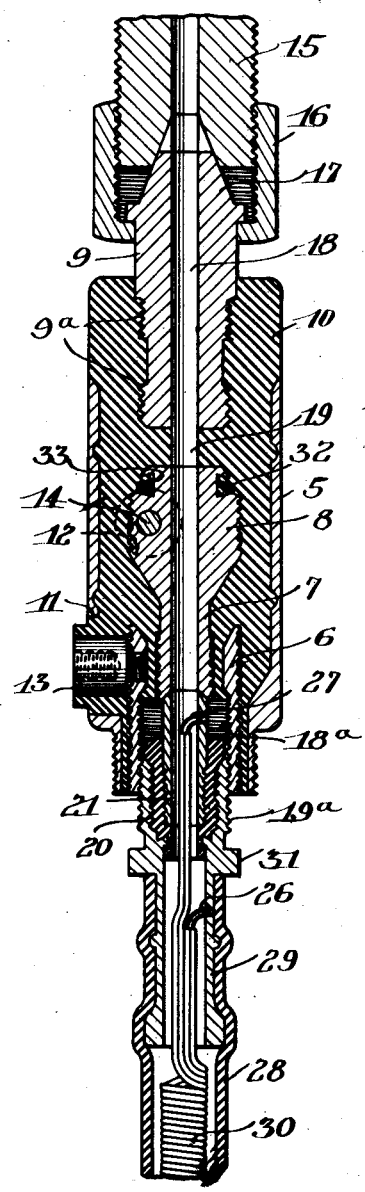
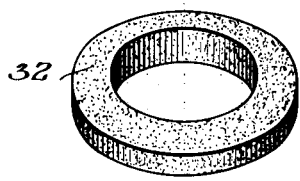
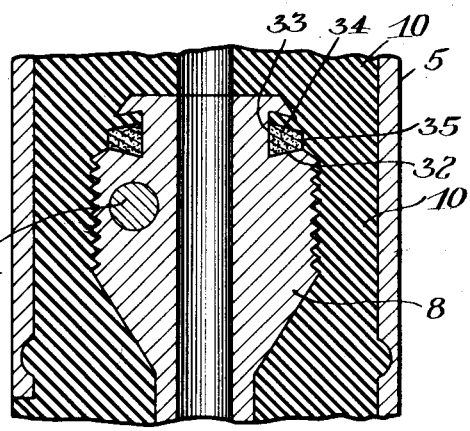
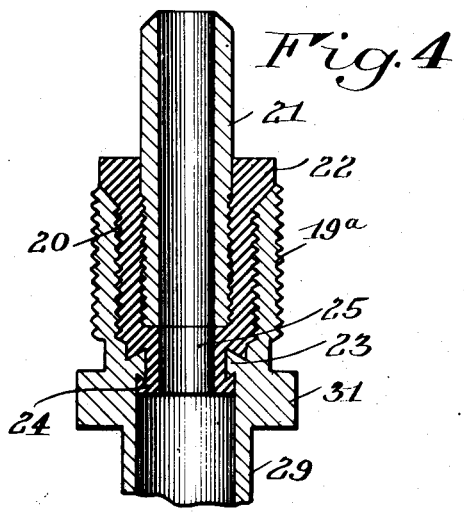
INVENTOR
Alphonse F. Pieper
BY
Cumpsty & Griffith
his ATTORNEYS Patented June 24, 1930

1,767,612

UNITED STATES PATENT OFFICE

ALPHONSE F. PIEPER, OF ROCHESTER, NEW YORK

COUPLING FOR CONDUCTORS

Application filed April 28, 1926. Serial No. 105,306.

This invention relates to coupling means for supply lines or conductors, such, for example, as those employed for supplying electrical power and air or other fluids to dental syringes and other instruments, being in the nature of an improvement upon the device of this character disclosed in my Patent No. 1,592,224, granted July 13, 1926, for coupling for conductors.

One object of the present invention is to provide an efficient coupling of the above character embodying an improved form of construction for uniting the metallic and molded insulating parts in a more efficient manner.

Another object of the invention is to provide means of a yieldable or expansible nature interposed at one or more points between certain of the metallic and molded insulating parts of the coupling and compressed therebetween so that in cases of shrinkage or contraction of one or more of said parts, effective means will be provided to prevent the escape of any of the fluid in the conduit past the joint formed by said parts.

To these and other ends the invention resides in certain improvements and combinations of parts, all as will be hereinafter more fully described, the novel features being pointed out in the claims at the end of the specification.

In the drawings:—

Figure 1 is a longitudinal central section through a coupling embodying one form of the present invention.

Figure 2 is a detailed perspective view of a flexible ring adapted to be applied between certain of the metallic and molded parts of the coupling to afford a fluid tight joint therebetween.

Figure 3 is a fragmentary longitudinal section illustrating the application of the ring; and Figure 4 is an enlarged sectional view of parts shown in Figure 1 taken longitudinally of the coupling.

Similar reference numerals throughout the several views indicate the same parts.

This invention is embodied in the present instance in a coupling for supply lines or conductors of the general character disclosed in my patent referred to above wherein suitable means are provided for uniting the air supply line or tube with electrical conductors for connecting both such lines in properly insulated relation through a single conduit with the dental syringe or other instrument to be operated thereby.

Referring more particularly to the drawings, the coupling is shown in Figure 1 as comprising a sleeve-like metal reenforcing jacket or casing 5 within which are disposed in spaced concentric relation with the casing and with each other an outer sleeve 6 of suitable electrically conductive metal and an inner sleeve 7 of similar nature having an end projecting beyond the end of sleeve 6 and enlarged as at 8 for a purpose which will presently appear.

A nipple 9 is located adjacent one end of casing 5 and these various parts are integrally united in insulated relation by a body 10 of suitable non-conductive material, such as, for example, "Bakelite" or rubber, the nipple having roughened or threaded portions 9ª anchored in the non-conductive material of the body.

The metal parts described are suitably supported in their proper relative positions in a mold and the material of body 10 is molded within casing 5 and between and around the metal parts to form a strong, unitary construction as shown in the drawings and at a comparatively low cost of production. The casing 5 and sleeves 6 and 7 have the surfaces thereof engaged by the molded material 10 roughened, as for example, by the formation of grooves or screw threads as shown, to anchor the metal and molded portions against relative movement in securely fixed relation with each other.

Casing 5 has openings formed therein, as indicated at 11 and 12, through which binding posts 13 and 14 enter the molded material and are electrically connected at their inner ends with sleeves 6 and 7 respectively, the end of sleeve 7 being enlarged to more securely anchor the same in the molded material and to afford ample material for the attachment of the binding posts which latter of course are spaced and insulated from casing 5. Electrical conductors from the source of supply not shown are connected to the binding posts and thus transmit current to and from the sleeves 6 and 7, which are completely insulated from each other by the molded material as described.

The coupling is attached to a fluid supply line indicated at 15 by means of a union connection 16 on the nipple 9, the latter having a cone shaped end 17 fitting within a correspondingly shaped recess within the connection 15 to form a fluid tight joint between said parts. The nipple 9 has a central opening 18 in alignment with the bore of sleeve 7 and the insulating material is also formed centrally with a bore 19 forming a part of a continuous passage through the coupling from the air supply line 15 to the opposite end, to which is detachably connected a second coupling part through which the air and electric lines are carried in a single conduit to the instrument to be operated.

The complementary coupling part as embodied in the present instance is formed for detachable connection with the coupling part described above to which end the sleeve 6 of the latter has its wall internally threaded as at 18$^a$ and the complementary coupling part comprises an externally threaded, substantially tubular member 19$^a$ of suitable electrically conductive metal adapted to be screwed into the sleeve 6. Member 19$^a$ has at this end an enlarged opening 20 in which is located, in concentric spaced relation, a smaller tubular member 21 having its end seated against the end of sleeve 7 in electrical contact and fluid tight relation. Into the space between the members 19$^a$ and 21 is molded a body 22 of insulating material of the same general character as the body 10 described above, the members 19$^a$ and 21 being supported by suitable means in proper relative positions in a mold and the material 22 being molded within the member 19$^a$ and between the latter and the member 21. The surfaces of the members 19$^a$ and 21 engaging the molded material are preferably roughened as by grooves or screw threads to effect secure anchorage of the parts to prevent relative movement thereof. Material molded in the manner described, however, tends upon setting to shrink or contract and thus separate from an encircling member, such as the member 19$^a$, so that there is a tendency for the molded material to work loose and become detached from the tubular portion 19$^a$. It has been found that this difficulty may be overcome by providing the bore of the member 19$^a$ with shoulder portions 23 preferably of annular extent and dovetail shape in cross section. The material 22 is molded about the portion 23 as at 24, providing cooperating shoulders of interlocking dovetail shape of the member 19$^a$ and the body 22 which effectively hold the latter to the outer tubular member, thereby preventing its shrinkage or contraction and maintaining it in anchored relation with the roughened inner bore of member 19$^a$. A permanently integral construction is thus afforded for this portion of the coupling, the inner and outer metal members of which are insulated by the inner material 22. The latter is formed with a central passage 25 communicating with the bores of members 19$^a$ and 21 which are in electrical contact with the conducting sleeves 6 and 7, respectively, of the electric circuit, and as shown in Figure 1, wires 26 and 27 are electrically connected in pairs with members 19$^a$ and 21, respectively, and extended into a flexible conduit 28, the end of which is fixed over the end 29 of member 19$^a$. The wires are provided in pairs to insure continued connection in case one of them should break and are preferably coiled as at 30 within the tube 28 to flexibly support the walls of the latter. An angular portion or nut 31 is formed on member 19$^a$ for convenience in screwing the latter into and out of the sleeve 6.

It has been found that the molded material 10 surrounding the metallic sleeve 7 tends to become slightly separated from the sleeve 7 upon cooling, due to the unequal contraction of the parts thus permitting the air or fluid in the conduit to escape or leak past the joint formed by these parts. The size of this opening may be increased from time to time by contraction of the sleeve, thus increasing the chances of escape of the fluid between said parts. In order to prevent leakage or escape of the fluid from the coupling between said parts I provide at one or more points a flexible or expansible ring 32, preferably interposed between the upper end portion 8 of the sleeve and said body, the sleeve having an annular groove or recess 33 formed therein for the reception of the ring, the groove being preferably larger in cross section than the ring to permit the molded material to enter the groove and engage the ring on the face 34 thereof as well as on its peripheral face 35 as shown in Figure 3. The ring is preferably formed of relatively soft and highly resilient rubber capable of being compressed to a considerable degree by the insulating material 10 which is forced into the casing 5 under a relatively high pressure before it is allowed to harden. The ring therefore, due to its high degree of resiliency and the fact that it is compressed within the groove 33 will expand upon expansion of the molded material or upon contraction of the metallic sleeve portion 8, whereby a fluid tight joint is afforded at all times and under all conditions of service. The fluid within the bore of the coupling is thus prevented from leaking past the joint regardless of the separation which may take place between the enlarged portion 8 of the sleeve and the insulating material surrounding the same. The ring is preferably tapered in cross section, being thinner at its outer than at its inner edge, so as to afford a wedge-shape section whereby it will more readily expand into the groove as it becomes enlarged through expansion of the molded material, the groove being formed partly by the portion 8 of the sleeve and partly by the insulating material. The ring is applied by forcing it over the outer extremity of the portion 8 of the sleeve and into the groove as shown in Figure 3. This improved construction for rigidly combining the molded and metal parts into a permanently integral element affords a coupling capable of durably withstanding the strains imposed in use as well as any deterioration in the insulating material and facilitates the production of an efficient article in an inexpensive manner.

What I claim is:—

1. A supply line coupling comprising a tubular member, a second tubular member disposed within the first in spaced relation thereto, a body of material molded in the space between said members and adapted to unite the same and a yieldable member of tapered cross section encircling said second tubular member and adapted to be compressed by said material whereby upon expansion of the latter the ring will expand to maintain a fluid tight joint between said second tubular member and the material.

2. A supply line coupling comprising a tubular member, a casing comprising a body of molded material in which said tubular member is embedded, and a yieldable ring encircling said tubular member and adapted to be compressed by said material whereby upon separation of the latter from the tubular member the ring will expand to maintain a fluid tight joint between the molded material and the tubular member.

3. A supply line coupling, comprising a tubular member, a second tubular member disposed within the first in spaced relation thereto, a body of material molded in the space between said members and adapted to unite the same, and expansible packing means encircling the second tubular member and partially embedded in said material, whereby upon separation of the second tubular member and the surrounding material, said packing means will expand to maintain a fluid tight joint between said member and the material.

ALPHONSE F. PIEPER.